US006776693B2

(12) United States Patent
Duboust et al.

(10) Patent No.: US 6,776,693 B2
(45) Date of Patent: *Aug. 17, 2004

(54) METHOD AND APPARATUS FOR FACE-UP SUBSTRATE POLISHING

(75) Inventors: Alain Duboust, Sunnyvale, CA (US); Shou-Sung Chang, Los Altos, CA (US); Liang-Yuh Chen, Foster City, CA (US); Yan Wang, Sunnyvale, CA (US); Siew Neo, Santa Clara, CA (US); Lizhong Sun, San Jose, CA (US); Feng Q. Liu, Cupertino, CA (US)

(73) Assignee: Applied Materials Inc., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/163,796

(22) Filed: Jun. 4, 2002

(65) Prior Publication Data

US 2003/0114087 A1 Jun. 19, 2003

Related U.S. Application Data

(60) Provisional application No. 60/342,281, filed on Dec. 19, 2001.

(51) Int. Cl.[7] ................................................. B24B 1/00
(52) U.S. Cl. ............................... 451/41; 451/5; 451/36; 451/60; 451/286; 451/289; 451/397; 451/398; 204/224 M; 205/662
(58) Field of Search ............................... 451/285–288, 451/397–398, 41, 290, 271, 5, 60, 446, 36, 37, 39; 204/224 M; 205/662

(56) References Cited

U.S. PATENT DOCUMENTS

| 4,821,466 A | * | 4/1989 | Kato et al. ..................... 451/36 |
| 5,136,817 A | | 8/1992 | Tabata et al. |
| 5,575,706 A | * | 11/1996 | Tsai et al. ..................... 438/693 |

(List continued on next page.)

FOREIGN PATENT DOCUMENTS

| EP | 0 325 753 | 12/1988 |
| EP | 0 455 455 | 4/1991 |
| JP | 11042554 | 2/1999 |
| WO | 01 49452 | 7/2001 |
| WO | 02 064314 | 8/2002 |

OTHER PUBLICATIONS

Wang, et al., "Conductive Polishing Media for Electrochemical Mechanical Polishing", U.S. patent application No. 10/033,732, filed Dec. 27, 2001.

Duboust, et al., "Endpoint Detection for Electro Chemical Mechanical Polishing and Electropolishing Processes", U.S. patent application No. 10/05,316, filed Jan. 22, 2002.

Chen, et al., "Planarization of Substrates Using Electrochemical Mechanical Polishing", U.S. patent application No. 10/038,066, filed Jan. 3, 2002.

(List continued on next page.)

*Primary Examiner*—George Nguyen
(74) *Attorney, Agent, or Firm*—Moser, Patterson & Sheridan

(57) ABSTRACT

A method and apparatus are provided for polishing a substrate surface. In one aspect, an apparatus for polishing a substrate includes a basin and a polishing head. A carrier is disposed in the basin and has a substrate supporting surface. A retaining ring is disposed on the carrier and at least partially circumscribes the substrate supporting surface. The polishing head is supported above the basin and includes a conductive polishing pad. Embodiments may further include a vent to allow gas to escape through the polishing head. Embodiments may further include an electrolyte supply that flows electrolyte into the polishing head and out through a permeable electrode and the conductive pad to the substrate. Embodiments may also be configured with a polishing head diameter smaller than the substrate supported by the carrier.

46 Claims, 7 Drawing Sheets

U.S. PATENT DOCUMENTS

| | | | |
|---|---|---|---|
| 5,624,300 A | | 4/1997 | Kishii et al. |
| 5,807,165 A | * | 9/1998 | Uzoh et al. ................ 451/41 |
| 5,911,619 A | * | 6/1999 | Uzoh et al. ................. 451/5 |
| 5,934,979 A | | 8/1999 | Talieh |
| 5,938,504 A | | 8/1999 | Talieh |
| 5,944,582 A | | 8/1999 | Talieh |
| 6,004,880 A | * | 12/1999 | Liu et al. ................ 438/692 |
| 6,020,264 A | | 2/2000 | Lustig et al. |
| 6,056,851 A | | 5/2000 | Hsieh et al. |
| 6,080,049 A | * | 6/2000 | Numoto et al. ............ 451/285 |
| 6,103,096 A | * | 8/2000 | Datta et al. ............... 205/686 |
| 6,103,628 A | | 8/2000 | Talieh |
| 6,135,858 A | * | 10/2000 | Takahashi ................ 451/41 |
| 6,146,256 A | * | 11/2000 | Joo ....................... 451/285 |
| 6,159,080 A | | 12/2000 | Talieh |
| 6,171,467 B1 | | 1/2001 | Weihs et al. |
| 6,176,992 B1 | | 1/2001 | Talieh |
| 6,207,572 B1 | | 3/2001 | Talieh |
| 6,251,235 B1 | | 6/2001 | Talieh et al. |
| 6,258,231 B1 | * | 7/2001 | Easter et al. ............. 204/421 |
| 6,297,159 B1 | | 10/2001 | Paton |
| 6,299,506 B2 | * | 10/2001 | Nishimura et al. ........... 451/8 |
| 6,322,422 B1 | * | 11/2001 | Satou ....................... 451/8 |
| 6,328,629 B1 | * | 12/2001 | Togawa et al. ............... 451/8 |
| 6,368,190 B1 | * | 4/2002 | Easter et al. ............. 451/41 |
| 6,582,281 B2 | * | 6/2003 | Doan et al. ............... 451/41 |
| 6,610,190 B2 | * | 8/2003 | Basol et al. .............. 205/133 |
| 6,612,915 B1 | * | 9/2003 | Uzoh et al. ............... 451/285 |
| 6,613,200 B2 | * | 9/2003 | Li et al. .................. 204/198 |
| 2001/0024878 A1 | | 9/2001 | Nakamura |

OTHER PUBLICATIONS

Duboust, et al., "Electrolyte Composition and Treatment for Electrolytic Chemical Mechanical Polishing", U.S. patent application No. 10/032,275, filed Dec. 21, 2001.

International Search Report for PCT/US 02/11009 dated Feb. 6, 2003.

* cited by examiner

METHOD AND APPARATUS FOR FACE-UP SUBSTRATE POLISHING

CROSS-REFERENCE TO RELATED APPLICATIONS

This application claims benefit from U.S. Provisional Patent Application Serial No. 60/342,281, filed Dec. 19, 2001, which is incorporated herein by reference in its entirety.

BACKGROUND OF THE INVENTION

1. Field of the Invention

Embodiments of the present invention relate to a method and apparatus for planarizing a substrate surface.

2. Background of the Related Art

Sub-quarter micron multi-level metallization is one of the key technologies for the next generation of ultra large-scale integration (ULSI). The multilevel interconnects that lie at the heart of this technology require planarization of interconnect features formed in high aspect ratio apertures, including contacts, vias, lines and other features. Reliable formation of these interconnect features is very important to the success of ULSI and to the continued effort to increase circuit density and quality on individual substrates and die.

In the fabrication of integrated circuits and other electronic devices, multiple layers of conducting, semiconducting, and dielectric materials are deposited on or removed from a surface of a substrate. Thin layers of conducting, semiconducting, and dielectric materials may be deposited by a number of deposition techniques. Common deposition techniques in modern processing include physical vapor deposition (PVD), also known as sputtering, chemical vapor deposition (CVD), plasma-enhanced chemical vapor deposition (PECVD), and electro-chemical plating (ECP).

As layers of materials are sequentially deposited and removed, the uppermost surface of the substrate may become non-planar across its surface and require planarization. Planarizing a surface, or "polishing" a surface, is a process where material is removed from the surface of the substrate to form a generally even, planar surface. Planarization is useful in removing undesired surface topography and surface defects, such as agglomerated materials, crystal lattice damage, scratches, and contaminated layers or materials. Planarization is also useful in forming features on a substrate by removing excess deposited material used to fill the features and to provide an even surface for subsequent levels of metallization and processing.

Chemical mechanical planarization, or chemical mechanical polishing (CMP), is a common technique used to planarize substrates. CMP utilizes a chemical composition, typically a slurry or other fluid medium, for selective removal of material from substrates. In conventional CMP techniques, a substrate carrier or polishing head is mounted on a carrier assembly and positioned in contact with a polishing pad in a CMP apparatus. The carrier assembly provides a controllable pressure to the substrate urging the substrate against the polishing pad. The pad is moved relative to the substrate by an external driving force. The CMP apparatus effects polishing or rubbing movement between the surface of the substrate and the polishing pad while dispersing a polishing composition to effect chemical activity and/or mechanical activity and consequential removal of material from the surface of the substrate.

One material increasingly utilized in integrated circuit fabrication is copper due to its desirable electrical properties. However, copper has its own special fabrication problems. For example, copper is difficult to pattern and etch, and new processes and techniques, such as damascene or dual damascene processes, are being used to form copper substrate features. In damascene processes, a feature is defined in a dielectric material and subsequently filled with copper. Dielectric materials with low dielectric constants, i.e., less than about 3, are being used in the manufacture of copper damascenes. Barrier layer materials are deposited conformally on the surfaces of the features formed in the dielectric layer prior to deposition of copper material. Copper material is then deposited over the barrier layer and the surrounding field. However, copper fill of the features usually results in excess copper material, or overburden, on the substrate surface that must be removed to form a copper filled feature in the dielectric material and prepare the substrate surface for subsequent processing.

One challenge that is presented in polishing copper materials is that the conductive material and the barrier materials are often removed from the substrate surface at different rates, both of which can result in excess conductive material being retained as residues on the substrate surface. Additionally, the substrate surface may have different surface topography, depending on the density or size of features formed therein. Copper material is removed at different removal rates along the different surface topography of the substrate surface, which makes effective removal of copper material from the substrate surface and final planarity of the substrate surface difficult to achieve.

One solution to remove all of the desired copper material from the substrate surface is to overpolish the substrate surface. However, overpolishing of some materials can result in the formation of topographical defects, such as concavities or depressions in features, referred to as dishing, or excessive removal of dielectric material, referred to as erosion. The topographical defects from dishing and erosion can further lead to non-uniform removal of additional materials, such as barrier layer materials disposed thereunder, and produce a substrate surface having a less than desirable polishing quality.

Another problem with the polishing of copper surfaces arises from the use of low dielectric constant (low k) dielectric materials to form copper damascenes in the substrate surface. Low k dielectric materials, such as carbon doped silicon oxides, may deform or fracture under conventional polishing pressures (i.e., about 6 psi), called downforce, which can detrimentally affect substrate polish quality and detrimentally affect device formation. For example, relative rotational movement between the substrate and a polishing pad can induce a shear force along the substrate surface and deform the low k material to form topographical defects, which can detrimentally affect subsequent polishing.

One solution for polishing copper in low dielectric materials with reduced or minimal defects formed thereon is by polishing copper by electrochemical mechanical polishing (ECMP) techniques. ECMP techniques remove conductive material from a substrate surface by electrochemical dissolution while concurrently polishing the substrate with reduced mechanical abrasion compared to conventional CMP processes. The electrochemical dissolution is performed by applying an electrical bias between a cathode and substrate surface to remove conductive materials from a substrate surface into a surrounding electrolyte. During electrochemical dissolution, the substrate typically is placed in motion relative to a polishing pad to enhance the removal of material from the surface of the substrate. In one embodiment of an ECMP system, the electrical bias is applied by a ring of conductive contacts in electrical communication with the substrate surface in a substrate support device, such as a substrate carrier head. However, the contact ring has been observed to exhibit non-uniform distribution of current over the substrate surface, which results in non-uniform dissolution. Additionally, conventional polishing pads often limit electrolyte flow to the surface of the substrate. The polishing pad is typically composed of an electrically insulative material that may interfere with the application of the electrical bias to the substrate surface resulting in non-uniform or variable dissolution of material from the substrate surface. Moreover, current systems generally consume a large volume of electrolyte during process. For example, current systems generally have polishing surfaces that are immersed in electrolyte during processing. As the polishing surfaces are generally much larger than the substrate being polished, large volume of electrolyte must be utilized to cover the polishing surface and maintain the current paths. High usage of electrolyte contributes to excessive costs of process consumables.

As a result, there is a need for an improved polishing apparatus for the removal of conductive material from a substrate surface.

SUMMARY OF THE INVENTION

Aspects of the invention generally provide a method and apparatus for polishing a layer on a substrate using electrochemical deposition techniques, electrochemical dissolution techniques, polishing techniques, and/or combinations thereof. In one aspect, an apparatus is provided for polishing a substrate that includes a basin and a polishing head having a conductive pad. A carrier is disposed in the basin and has a substrate supporting surface. A retaining ring is disposed on the carrier and at least partially circumscribes the substrate supporting surface. The polishing head is supported above the basin.

In another embodiment, an apparatus for polishing a substrate includes a basin having a carrier disposed therein and a conductive polishing pad supported above the basin. The carrier has a substrate supporting surface that is adapted to support a substrate of a given diameter. The conductive polishing pad has a diameter less than the substrate's diameter.

In another embodiment, an apparatus for polishing a substrate includes a basin and a housing supported thereover. The basin is adapted to support a substrate in a face-up orientation. The housing has a conductive polishing pad coupled thereto. An electrode is disposed between the housing and conductive pad.

In another embodiment, an apparatus for polishing a substrate includes a basin and a housing supported thereover. The basin is adapted to support a substrate in a face-up orientation. The housing has a conductive polishing pad coupled thereto. An electrode is disposed between the housing and conductive pad. A vent is formed through the housing and is adapted to allow gas to escape therethrough.

In another aspect, a polishing pad for polishing a substrate is provided. In one embodiment, the polishing pad comprises a body having a polishing surface with one or more protrusions and a conductive element formed on the one or more protrusions. The conductive element has a contact surface for contacting a substrate.

In another aspect, a method for polishing a substrate is provided. In one embodiment, a method for polishing a substrate includes retaining a substrate in a face-up orientation, contacting the substrate with a conductive pad coupled to a polishing head, the polishing head having an electrode disposed therein, flowing electrolyte between the conductive pad and the electrode, biasing the conductive pad and electrode polishing the substrate, and venting gases evolved during polishing through the polishing head.

In another embodiment, a method for polishing a substrate includes retaining a substrate in a face-up orientation inside a ring, contacting the substrate with a conductive pad coupled to a polishing head, the polishing head having an electrode disposed therein, flowing electrolyte between the conductive pad and the electrode, and biasing the conductive pad and electrode.

In another embodiment, a method for polishing a substrate includes retaining a substrate in a face-up orientation, contacting the substrate with a conductive pad coupled to a polishing head, the polishing head having an electrode disposed therein, flowing electrolyte through the electrode and the conductive pad to the substrate, and biasing the conductive pad and electrode.

BRIEF DESCRIPTION OF THE DRAWINGS

A more particular description of the invention, briefly summarized above, may be had by reference to the embodiments thereof that are illustrated in the appended drawings. It is to be noted, however, that the appended drawings illustrate only typical embodiments of this invention and, therefore, are not to be considered limiting of its scope, for the invention may admit to other equally effective embodiments.

To facilitate understanding, identical reference numerals have been used, wherever possible, to designate identical elements that are common to the figures.

DETAILED DESCRIPTION OF THE PREFERRED EMBODIMENT

The words and phrases used herein should be given their ordinary and customary meaning in the art by one skilled in the art unless otherwise further defined herein. Chemical-mechanical polishing should be broadly construed and includes, but is not limited to, abrading a substrate surface by chemical activity, mechanical activity, or a combination of both chemical and mechanical activity. Electropolishing should be broadly construed and includes, but is not limited to, planarizing a substrate by the application of electrochemical activity. Electrochemical mechanical polishing (ECMP) should be broadly construed and includes, but is not limited to, planarizing a substrate by the application of electrochemical activity or a combination of both electrochemical and mechanical activity to remove material from a substrate surface. Electrochemical mechanical plating process (ECMPP) should be broadly construed and includes, but is not limited to, electrochemically depositing material on a substrate and concurrently planarizing the deposited material by the application of electrochemical activity, mechanical activity, or a combination of both electrochemical and mechanical activity.

Anodic dissolution should be broadly construed and includes, but is not limited to, the application of an anodic bias to a substrate directly or indirectly which results in the removal of conductive material from a substrate surface and into a surrounding electrolyte solution. Aperture should be broadly construed and includes, but is not limited to, a perforation, hole, opening, channel, or passage formed partially or completely through an object.

Figure 1:
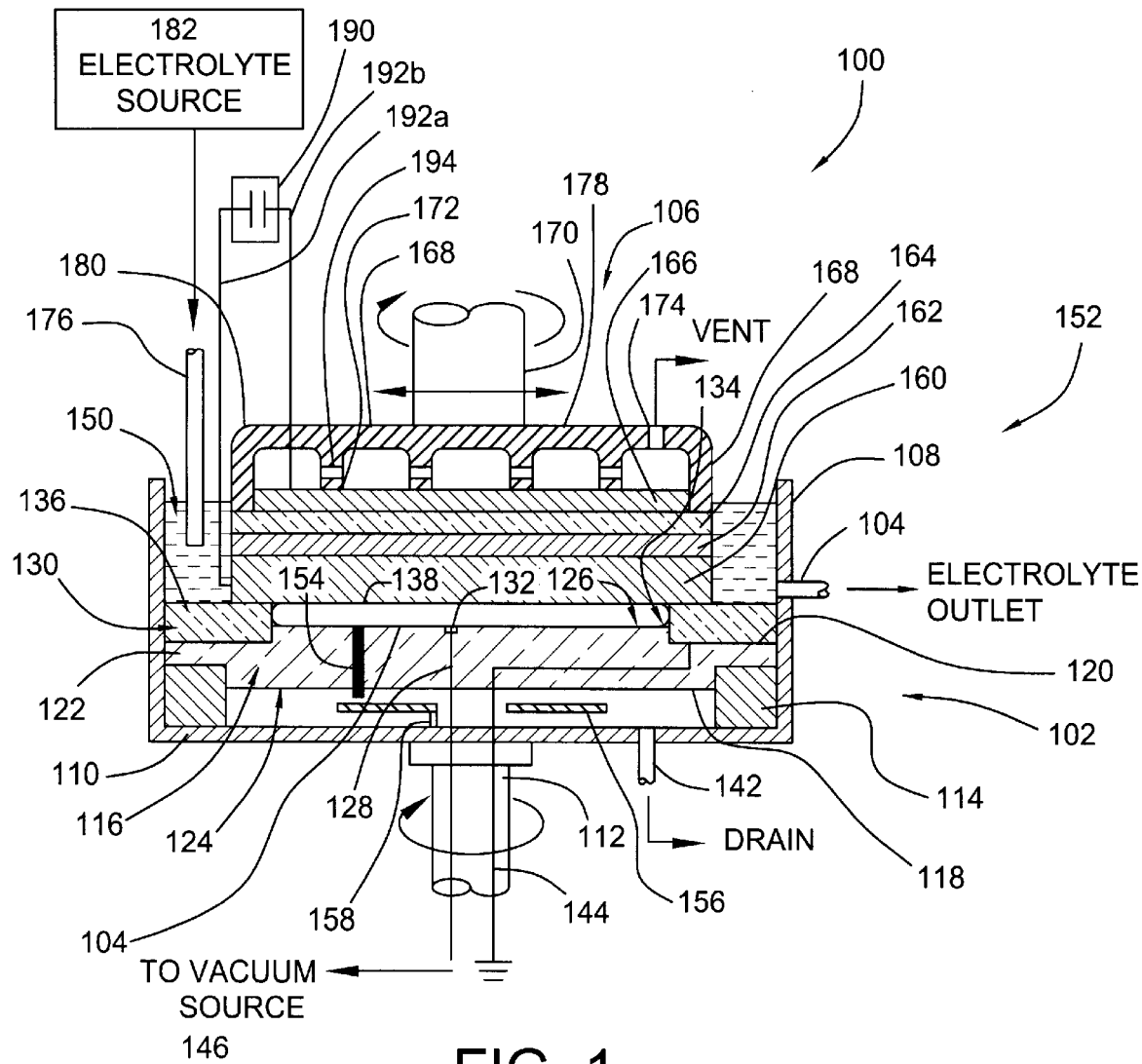
FIG. 1 is a sectional view of one embodiment of a processing cell of the invention.

FIG. 1 depicts a sectional view of one embodiment of a process cell 100 in which at least one process comprising anodic dissolution, plating and polishing process may be practiced. The process cell 100 generally includes a basin assembly 152 and a polishing head 106. A substrate 104 is retained in the basin assembly 152 during processing in a face-up (e.g., backside down) orientation. An electrolyte is flowed over a feature side 138 of the substrate during processing. The polishing head 106 is placed in contact with the substrate 104, and the polishing head 106 and the substrate are moved relative to each other to provide a polishing motion. The polishing motion generally comprises at least one motion defined by an orbital, rotary, linear or curvilinear motion, or combinations thereof, among other motions. The polishing motion may be achieved by moving either or both of the polishing head 106 and the basin assembly 152.

The basin assembly 152 generally includes a basin 102 having a substrate support or carrier 116 disposed therein. The carrier 116 generally supports the substrate 104 within the basin 102 during processing. The basin 102 can be a bowl shaped member made of a plastic such as fluoropolymers, TEFLON®, PFA, PE, PES, or other materials that are compatible with electroplating and electropolishing chemistries. The basin 102 generally includes sidewalls 108 and a bottom 110 that generally defines a container or electrolyte cell in which a conductive fluid such as the electrolyte can be confined. The bottom 110 generally includes a drain 142 to facilitate removal of fluids from the bottom of the basin 102, while the sidewalls 108 generally include an outlet 140 to facilitate removal of excess electrolyte from the basin 102 during processing.

The basin 102 may be stationary or be driven to provide at least a portion of a relative motion between the substrate 104 and the polishing head 106. In the embodiment depicted in FIG. 1, an optional shaft 112 is coupled to the bottom 110 of the basin 102 and is coupled to a drive system (not shown) to provide the basin 102 with a rotary, orbital, sweep motion or a motion comprising combinations thereof, among other motions. The shaft 112 additionally provides a conduit for ground leads 144 and other control or supply lines to be routed into or out of the basin 102. In embodiments wherein the basin 102 is rotated by the shaft 112, the drain 142 may also be routed through the shaft 112.

A spacer 114 is disposed on the bottom 110 of the basin 102. The spacer 114 is typically annular in form and is comprised of a material compatible with process chemistries. In one embodiment, the spacer 114 is fabricated from the same material as the basin 102. The spacer 114 may optionally be fabricated with the basin 102 as a single member from a unitary mass of material.

The carrier 116 is generally disposed in the basin 102 and supported by the spacer 114. The carrier 116 is typically fabricated from a dielectric material such as a polymer or a ceramic material. The carrier 116 generally includes a first side 118 and a second side 120. The first side 118 includes a flange 122 substantially circumscribing a projecting center section 124. The flange 122 is disposed on the spacer 114 and supports the carrier 116 above the bottom 110 of the basin 102. The center section 124 projects into the open area defined within the spacer 114 to locate the carrier 116 within the basin 102 and prevent movement of the carrier 116 during processing.

The second side 120 of the carrier 116 includes a projecting support surface 126 that extends towards the top of the basin 102. The support surface 126 generally supports the substrate 104 during processing. The support surface 126 includes at least one vacuum port 132 formed therein and coupled to a vacuum passage 128 disposed through the carrier 116. The vacuum passage 128 is fluidly coupled through the shaft 112 to a vacuum source 146. Vacuum, drawn through the vacuum port 132, retains the substrate 104 on the support surface 126 during processing. Optionally, the support surface 126 may include topography that enhances the distribution of vacuum between the substrate 104 and support surface 126 so that the substrate 104 is uniformly pulled towards the carrier 116.

A plurality of lift pins 154 (only one is shown for clarity) is disposed through respective holes formed through the carrier 116. A lift plate 156 disposed between the carrier 116 and the chamber bottom 110 is coupled to an actuator rod 158. The actuator rod 158 is routed through the shaft 112 to a lift mechanism (not shown). The lift mechanism may be actuated to move the rod 158 and lift plate 156 towards the carrier 116. The lift plate 156 contacts the pins 154 and causes the pins 154 to extend above the support surface 126 of the carrier 116, thus placing the substrate 104 in a spaced-apart relation relative to the carrier 116 that facilitates access to the substrate 104 by a substrate transfer device (not shown).

An annular retaining ring 130 is generally disposed on the flange 122 of the carrier 116. The retaining ring 130 generally snugly circumscribes and extends above a plane of the support surface 126 to define a substrate receiving pocket 134 therewith. The thickness of the retaining ring 130 is configured so that a top surface 136 of the retaining ring 130 is substantially co-planar (i.e., within about ±1 mil) with the feature side 138 of the substrate 104 to be processed. The sidewalls 108 generally extend above the retaining ring 130 to define a processing area 150. The outlet 140 is typically located in the sidewall 108 near the elevation of the top surface 136 of the retaining ring 130 to allow the removal of electrolyte from the processing area 150 during or after processing.

The top surface 136 of the retaining ring 130 is typically fabricated from a material that does not adversely affect the polishing head 106 which may periodically contact the top surface 136. In one embodiment, the retaining ring 130 is fabricated from a material compatible with processing chemistries, for example, a thermoplastic such as polyphenylene sulfide (PPS) among other polymers. The retaining ring 130 may be grounded by the ground lead 144 that is routed out of the process cell 100 through the shaft 112. If the retaining ring 130 is a thermoplastic or other dielectric, there is no need to ground it since it is an electrical insulator.

Alternatively, the ring 130 may be conductive or metallic to promote uniformity across the wafer (particularly at the edge of the substrate). For example, an ungrounded copper retaining ring 130 may be used that has the same potential as the substrate during processing to enhance the uniformity the electrical field lines the substrate center and the edge.

The polishing head 102 generally includes a conductive pad 160, an optional membrane 162, a support disk 164 and an electrode 166 coupled to a housing 168. The conductive pad 160 and electrode are coupled be a power source 190 through leads 192A, 192B. The conductive pad 160 is generally exposed at the bottom of the polishing head 102 and contacts the substrate 104 and, in some embodiments, the retaining ring 130 during processing. The membrane 162 is sandwiched between the conductive pad 160 and the support disk 164. The electrode 166 is disposed between the support disk 164 and the interior of the housing 168. The pad 160, membrane 162, disk 164 and electrode 166 are permeable, perforated, or contain passages formed therethrough that allow the electrolyte to flow into and out of the polishing head 102. It is intended that term "or" denotes at least one or any combination of attributes when describing the ability of electrolyte pass through a component.

The polishing head 106 may be stationary or driven to provide at least a portion of the relative motion between the substrate 104 and the polishing head 106. In the embodiment depicted in FIG. 1, the housing 168 is coupled to a drive system (not shown) by a column 170. The drive system moves the column 170 thereby providing the polishing head 106 with a rotary, orbital, sweep motion or a motion comprising combinations thereof, among other motions. The column 170 additionally provides a conduit for electrical leads and other control or supply lines to be routed into or out of the polishing head 106.

The housing 168 is generally fabricated from a rigid material compatible with process chemistries. The housing 168 generally includes a top 178 which is coupled to the column 170 and sides 180 extending therefrom. The sides 180 typically are coupled to the support disk 164, enclosing the electrode 166 within the housing 168. A plurality of spacing members 172 (such as bosses, concentric or radial ridges or other projecting elements) generally extend from the top 178 into the interior of the housing 168. The spacing members keep the electrode 166 in a spaced-apart relation relative to the top 178. The members 172 generally support the electrode 166 in an orientation parallel to the surface of the substrate 104. The members 172 are configured to allows fluids to move laterally within the housing 168. In one embodiment, at least one member 172 includes a cross-hole 194 formed therethrough to allow fluid passage. A vent 174 is disposed through the top 180 of the housing 168 to allow gas to escape from within the housing 168. For example, hydrogen gas evolved during processing at the electrode 166 may be directly evacuated from the polishing head 106. As evolved hydrogen gas is removed from the process cell 100 without touching the surface of the substrate 104, defects are prevented during polishing while promoting uniform and repeatable electro-polishing performance.

The electrode 166 is a counter-electrode to the substrate 104 and/or conductive pad 160 contacting the substrate surface. The conductive pad 160 is at least partially conductive and may act as an electrode in combination with the substrate during electrochemical processes, such as an electrochemical mechanical plating process (ECMPP), which includes electrochemical deposition and chemical mechanical polishing, or electrochemical dissolution. The electrode 166 may be an anode or cathode depending upon the positive bias (anode) or negative bias (cathode) applied between the electrode 166 and conductive pad 160.

For example, when depositing material from an electrolyte onto the substrate surface, the electrode 166 acts as an anode and the substrate surface and/or conductive pad 160 acts as a cathode. When removing material from a substrate surface, such as by dissolution from an applied bias, the electrode 166 functions as a cathode and the substrate surface and/or conductive pad 160 acts as an anode for the dissolution process.

The level of the electrolyte within the basin 102 is maintained at a level that ensures that the electrode 166 is immersed in the electrolyte during processing. The electrode 166 is permeable to the electrolyte and gases, and can be a plate-like member, a plate having multiple holes formed therethrough or a plurality of electrode pieces disposed in a permeable membrane or container.

The electrode 166 typically is comprised of the material to be deposited or removed, such as copper, aluminum, gold, silver, tungsten and other materials which can be electrochemically deposited on the substrate 104. For electrochemical removal processes, such as anodic dissolution, the electrode 166 may include a non-consumable electrode of a material other than the deposited material, such as platinum for copper dissolution. The non-consumable electrode is used in planarization processes combining both electrochemical deposition and removal.

The support disk 164 is perforated or permeable to the electrolyte and gases. The support disk 164 is made from a material compatible with the electrolyte which would not detrimentally affect polishing. The support disk 164 may be fabricated from a polymer, for example fluoropolymers, PE, TEFLON®, PFA, PES, HDPE, UHMW or the like. In one embodiment, the support disk 164 is stiffer than the conductive pad 160. The support disk 164 is typically secured in the housing 168 of the polishing head 106 using adhesives, fasteners or other devices or methods that substantially ensure the parallelism of the support disk 164 and the carrier 116. The support disk 164 may be spaced from the electrode 166 to provide a wider process window, thus reducing the sensitivity of depositing material and removing material from the substrate surface to the electrode 166 dimensions.

In one embodiment, the support disk 164 includes a plurality of perforations or channels (not shown) formed therein. The size and density of the channels are selected to provide uniform distribution of the electrolyte through the support disk 164 to the substrate 104. In one aspect, the support disk 164 includes channels having a diameter between about 0.5 mm and about 10 millimeters. The channels may have a density between about 30% and about 80% of the polishing media. A channel density of about 50% has been observed to provide electrolyte flow with minimal detrimental effects to polishing processes. Generally, the channels of the support disk 164 and the conductive pad 160 may be aligned to provide for sufficient mass flow of electrolyte through the support disk 164 and conductive pad 160 to the substrate surface.

The membrane 162 is generally permeable, thereby allowing the electric field lines, electrolyte and other liquids and gases to pass therethrough. The membrane 162 generally prevents particles or sludge released from the electrode 166 from passing through the electrolyte and contacting the substrate 104. The membrane 162 is typically fabricated from a porous ceramic or polymer that is compatible with process chemistries and does not increase the cell resistance. For example, a spunbonded polyolefin (such as TYVEK®, available from E. I. DuPont de Nemours Inc. of Wilmington, Del.) may be used.

While the following conductive pad 160 is described for an electrochemical-mechanical polishing (ECMP) process, the invention contemplates using the conductive polishing media (pads) in other fabrication processes involving electrochemical activity. Examples of such processes using electrochemical activity include electrochemical deposition, which involves a conductive pad 160 being used to apply a uniform bias to a substrate surface for depositing a conductive material without the use of a conventional bias application apparatus, such as edge contacts, and electrochemical mechanical plating processes (ECMPP) that include a combination of electrochemical deposition and chemical mechanical polishing.

The conductive pad 160 can be a pad, a web or a belt of material, which is compatible with the fluid environment and the processing specifications. In the embodiment depicted in FIG. 1, the conductive pad 160 is circular in form and is adhered or otherwise retained to the membrane 162 at the bottom of the polishing head 106 opposite the housing 168 of the polishing head 106. The conductive pad 160 includes one or more conductive elements (not shown in FIG. 1) for contacting the feature side 135 of the substrate 104 during processing. A backing material (not shown) may be disposed between the membrane 162 and the conductive pad 160 to tailor the compliance and/or durometer of the conductive pad 160 during processing. Examples of a conductive pad that may be adapted to benefit from the invention are disclosed in U.S. patent application Ser. No. 10/033,732, filed Dec. 27, 2001, which is incorporated herein by reference in its entirety.

Figure 2A:
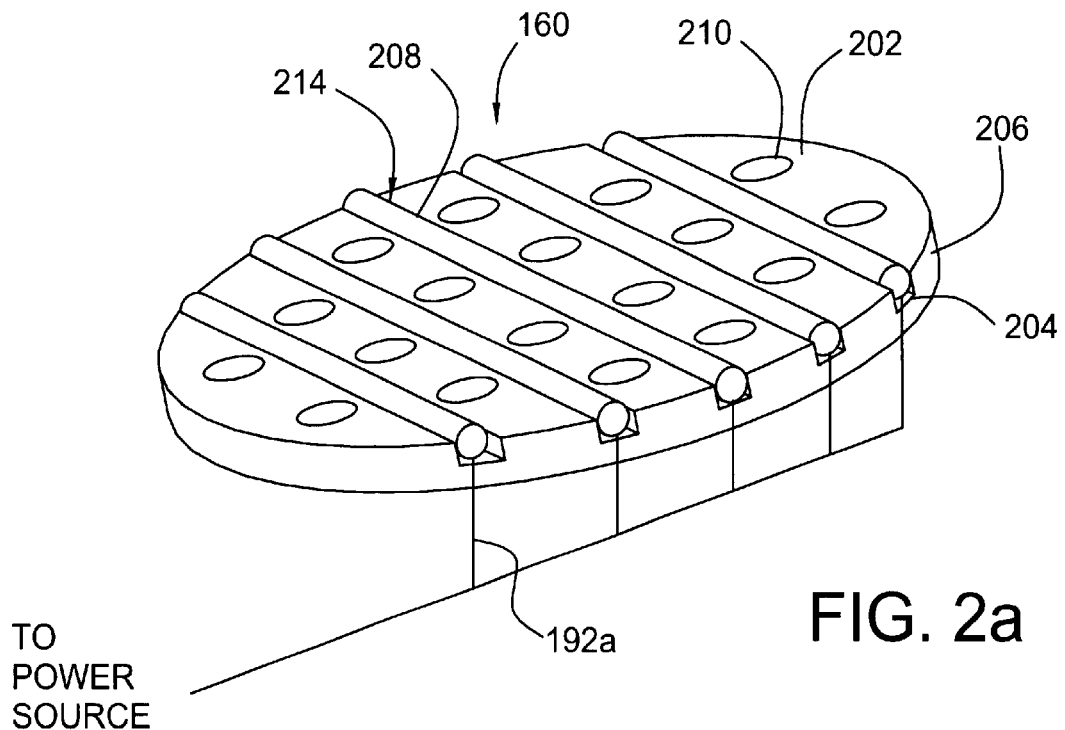
FIGS. 2A–2B are partial perspective views of two embodiments of a conductive pad.

FIG. 2A depicts one embodiment of the conductive pad 160. The conductive pad 160 generally comprises a body 206 having a polishing surface 202 adapted to contact the substrate while processing. The polishing surface 202 has one or more pockets 204 formed therein to at least partially receive a respective conductive element 214. The conductive elements 214 generally have a contact surface 208 that extends above a plane defined by the polishing surface 202. The contact surface 208 is typically compliant to maximize electrical contact with the substrate without scratching. During polishing, the substrate generally provides a bias force that urges the contact surface 208 into a position co-planar with the polishing surface 202.

The body 206 is generally permeable to the electrolyte by a plurality of channels or apertures 210 formed therein. The plurality of apertures 210 allows electrolyte to flow through the body 206 and contact the surface of the substrate during processing. Apertures 210 formed in the conductive pad 160 may include perforations, channels, or holes in the body 206. The aperture size and density is selected to provide uniform distribution of electrolyte, as well as current distribution, through the conductive pad 160 to a substrate surface.

The body 206 of the conductive pad 160 is generally made of a dielectric material. Examples of materials suitable for use in the body 206 include conventional polishing materials typically comprised of polymeric materials, such as polyurethane, polycarbonate, polyphenylene sulfide (PPS), or combinations thereof, and other polishing materials, such as ceramic material, used in polishing substrate surfaces. A conventional polishing media typically comprises polyurethane and/or polyurethane mixed with fillers. Conventional polishing media, such as the Freudenberg FX 9, pad is commercially available from Freudenberg & Company, of Weinheim, Germany. Other conventional polishing materials, such as a layer of compressible material, may also be utilized for the body 206.

The pockets 204 generally are configured to retain the conductive elements 214 while processing, and accordingly may vary in shape and orientation. In the embodiment depicted in FIG. 2A, the pockets 204 are grooves of rectangular cross section and are disposed across the polishing surface 202 coupling two points on the perimeter of the conductive pad 160. Alternatively, the pockets 204 (and conductive elements 214 disposed therein) may be disposed at irregular intervals, be orientated radially, perpendicular and may additionally be linear, curved, concentric, involute curves or other orientation.

Typically, the conductive elements 214 may include conductive polymers, polymer composites with conductive materials, conductive metals or polymers, conductive fillers, graphitic materials, or conductive doping materials, or combinations thereof. The conductive elements 214 generally have a bulk resistivity or a bulk surface resistivity of about 10 $\Omega$-cm or less.

A connector 212 is utilized to couple the conductive elements 214 to the lead 192a and the power source 190 to electrically bias the conductive elements 214 while processing. The connector 212 is generally a wire, tape or other conductor compatible with process fluids or having a covering or coating that protects the connector 212 from the process fluids. The connector 212 may be coupled to the conductive elements 214 by soldering, stacking, brazing, clamping, crimping, riveting, fastening, conductive adhesive or by other methods or devices. Examples of materials that may be utilized in the connector 212 include insulated copper, graphite, titanium, platinum, gold, and HASTELOY® among other materials. The connector 212 may be coated with, for example, a polymer. In the embodiment depicted in FIG. 2A, one connector 212 is coupled to each conductive elements 214 at the perimeter of the conductive pad 160. Alternatively, the connectors 212 may be disposed through the body 206 of the conductive pad 160. In yet another embodiment, the connector 212 may be coupled to a conductive grid (not shown) disposed in the pockets and/or through the body 206 that electrically couples the conductive elements 214.

Figure 2B:
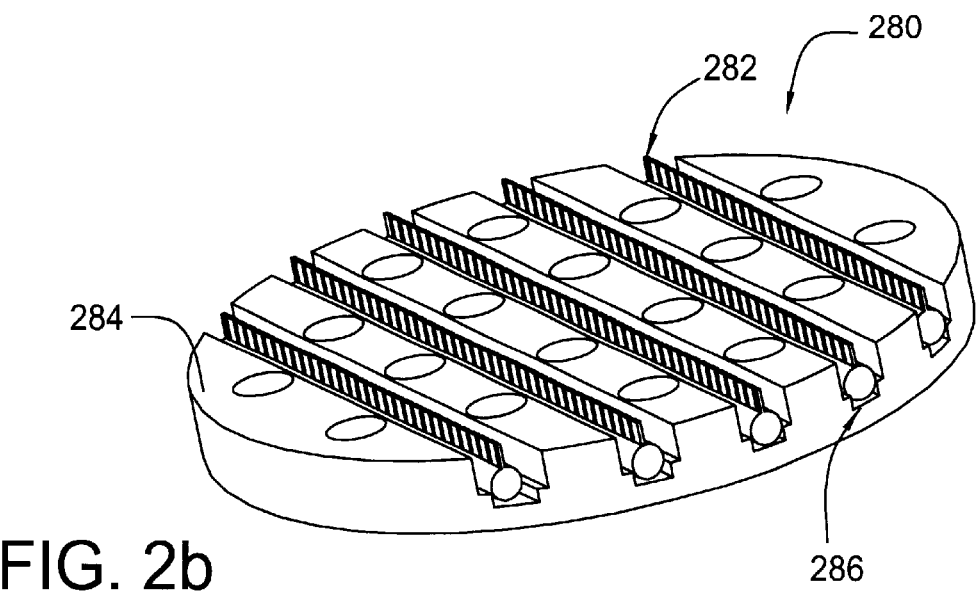

FIG. 2B depicts another embodiment of a conductive pad 280. The conductive pad 280 has one or more at least partially conductive elements 282 disposed on a polishing surface 284. The conductive elements 282 generally comprise a plurality of fibers, strands and/or flexible fingers that contact the substrate while processing. The conductive elements 282 are typically comprised of an at least partially conductive material as described above. In the embodiment depicted in FIG. 2B, the conductive elements 282 are a brush comprised of electrically conductive fibers, such as carbon fibers or other conductive, compliant (i.e., flexible) made from material described above.

The conductive elements 282 generally are disposed in a pocket 286 formed in the polishing surface 284 and may be orientated between 0 and 90 degrees relative to the polishing surface 284. In embodiments where the conductive elements 282 are orientated parallel to the polishing surface 284, the conductive elements 282 may partially be disposed on the polishing surface 284. Other configurations of conductive pads are contemplated.

Figure 3:
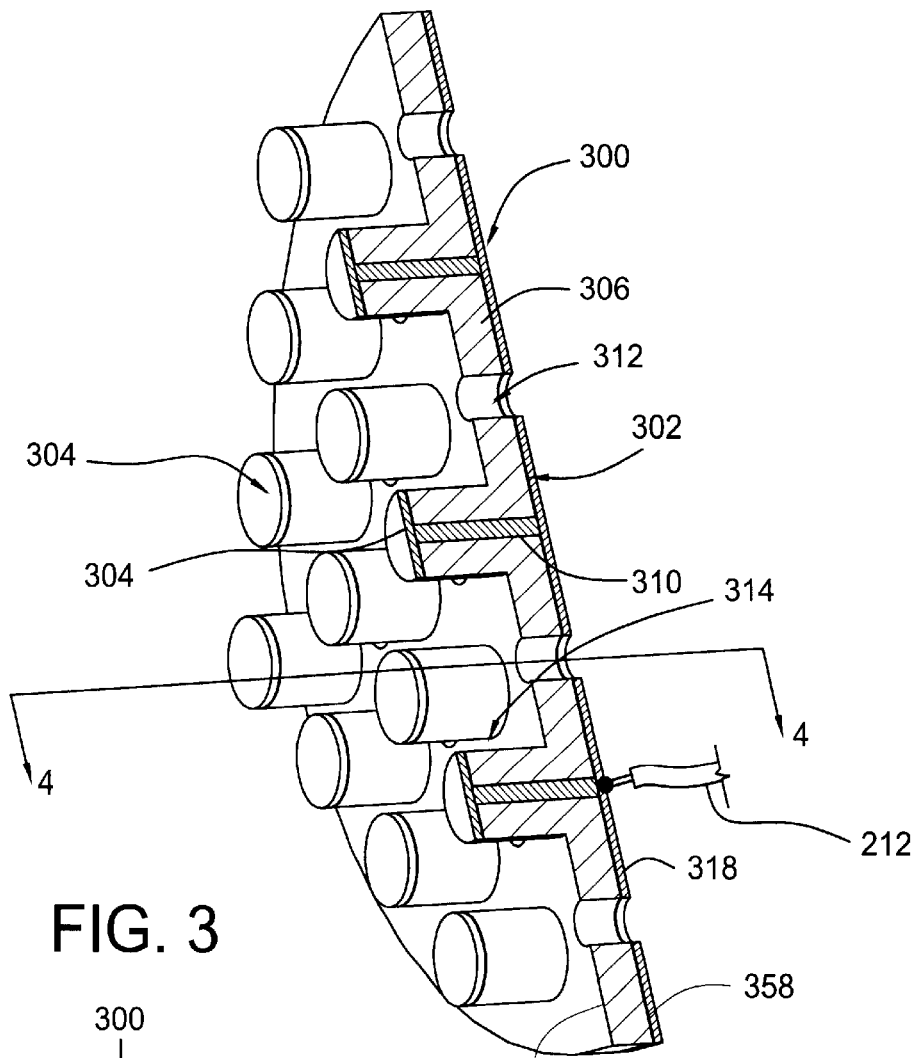
FIG. 3 is a three dimensional bottom perspective view of another embodiment of a conductive pad.
Figure 4:
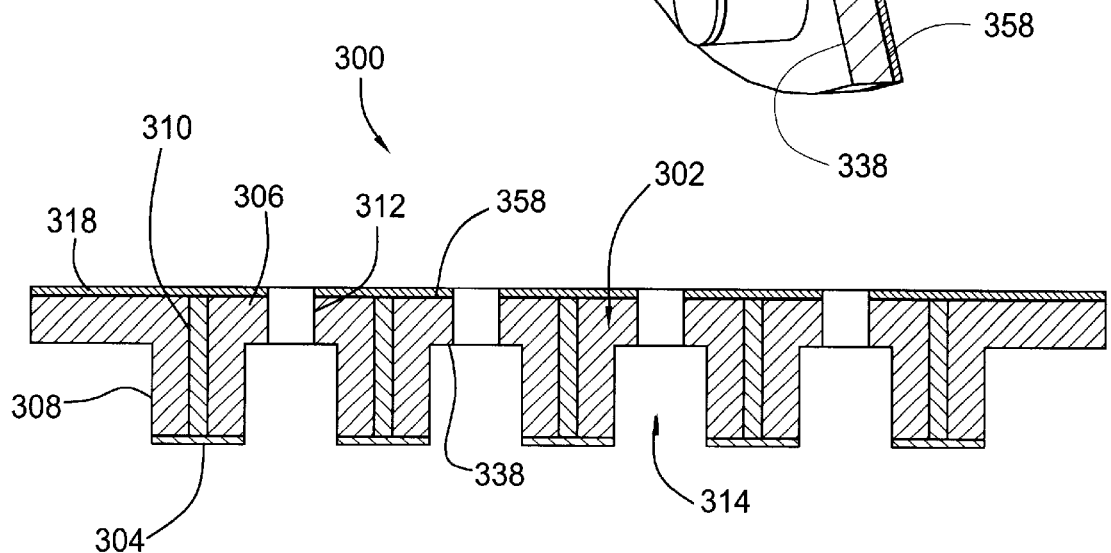
FIG. 4 is a sectional view of the conductive pad of FIG. 3.

FIGS. 3 and 4 depict bottom perspective and sectional views of another embodiment of a conductive pad 300. The conductive pad 300 includes a support pad 302 and a plurality of contact pads 304. The support pad 302 includes a perforated base 306 having a plurality of posts 308 extending therefrom. The perforated base 306 has a first surface 338 that faces the basin 102 and an opposing second surface 358. A plurality of apertures 312 are formed through the perforated base 306 to allow fluid to flow therethrough. The posts 308 extend from the first surface 338 of the perforated base 306 to support the contact pads 304. An interstitial space 314 is defined through the posts 308 to allow fluid, such as electrolyte, to flow between the posts 308 uniformly across the diameter of the conductive pad 300.

The support pad 302 is generally fabricated from a dielectric material similar to the dielectric materials described above for body 206 with reference to FIG. 2A. The support pad 302 may also be a compressible material such as an elastomer or foamed polymer that is compatible with processing chemistries.

The contact pads 304 are fabricated from a conductive material and are disposed on the end of each post 308 opposite the base 306. A wire 310 or other conductive element is formed through each post 308 and is electrically connected to each contact pad 304. The wires 310 exiting each post 308 are coupled to the connector 212 that couples the contact pads 304 to the lead 192a and the power source 190 to electrically bias the contact pads 304 while processing. Preferably, a conductive backing 318 may be formed on the opposing surface 358 of the perforated base 306 to electrically couple the individual wires 310 disposed through each post 308. The conductive backing 318 provides a single connection point between the connector 212 and wires 310. The power source 190 applies an electrical bias to the contact pads 304 of the conductive pad 300 to facilitate the polishing of a conductive layer or to facilitate the deposition of a conductive layer onto a substrate, as described below.

The following describes one mode of operation of the polishing cell 100 with reference to FIG. 1. In operation, the substrate 104 is transferred to the support surface 126 of the carrier 116 in a typical lift pin assisted transfer operation. The polishing head 106 is lowered into the basin 102 to place the conductive pad 160 in contact with the substrate 104 or at least proximate thereto. Electrolyte is supplied to the basin 102 through an inlet tube or nozzle 176 coupled to an electrolyte source 182. The electrolyte floods the basin 102 and at least partially immerses the polishing head 106 when lowered to contact the conductive pad 160 with the substrate retained in the basin. The electrolyte flows into the polishing head 106 to a level that contacts the electrode 166 thereby providing a conductive path between the electrode 166 and the substrate.

The electrolyte used in processing the substrate 104 can include metals such as copper, aluminum, tungsten, gold, silver or other materials that can be electrochemically deposited onto or electrochemically removed from the substrate 104. Electrolyte solutions may include commercially available electrolytes. For example, in copper containing material removal, the electrolyte may include sulfuric acid based electrolytes or phosphoric acid based electrolytes, such as potassium phosphate ($K_3PO_4$), or combinations thereof. The electrolyte may also contain derivatives of sulfuric acid based electrolytes, such as copper sulfate, and derivatives of phosphoric acid based electrolytes, such as copper phosphate. Electrolytes having perchloric acid-acetic acid solutions and derivatives thereof may also be used. Additionally, the invention contemplates using electrolyte compositions conventionally used in electroplating or electropolishing processes, including conventionally used electroplating or electropolishing additives, such as brighteners among others. In one aspect of the electrolyte solution, the electrolyte may have a concentration between about 0.2 and about 1.2 Molar of the solution.

As one example, copper sulfate ($CuSO_4$) can be used as the electrolyte. One source for electrolyte solutions used for electrochemical processes such as copper plating, copper anodic dissolution, or combinations thereof is Shipley Leonel, a division of Rohm and Haas, headquartered in Philadelphia, Pa., under the tradename ULTRAFILL 2000.

Power from the power source 190 is then applied to the conductive pad 160 and the electrode 166 through leads 192A, 192B. The bias between conductive pad 160 and the electrode 166 results in the removal of conductive material, such as copper, disposed on the surface of the substrate 104, by an anodic dissolution method.

The substrate 104 and conductive pad 160 are moved relative to one another to uniformly polish a surface of the substrate 104. The polishing motion may be applied before, after, or simultaneously with the application of the electrical bias. When contacting the a surface of the substrate 104, the conductive pad 160 typically applies a pressure of about 6 psi or less to the substrate surface. A pressure between about 1.5 psi or less may be used with substrate containing low dielectric constant material between the substrate 104 and the conductive pad 160 during polishing of the substrate 104. In one embodiment, a pressure of about 0.1 to about 0.5 psi is utilized.

In anodic dissolution, the bias is applied to the electrode 166, performing as a cathode, and the conductive pad 160 and the substrate 104, performing as the anode. The application of the bias allows removal of deposited material from the substrate surface. The bias may include the application of a voltage of about 15 volts or less to a surface of the substrate 104. A voltage between about 0.1 volts and about 10 volts may be used to dissolve copper-containing material from the substrate surface into the electrolyte. Alternatively, the bias may be a current density between about 0.1 milliamps/$cm^2$ and about 50 milliamps/$cm^2$, or between about 0.1 amps to about 20 amps for a 200 mm substrate. It is believed that biasing the substrate via the conductive pad 160 provides uniform dissolution of conductive materials, such as metals, into the electrolyte from the substrate surface as compared to conventional polishing devices which bias the substrate through the substrate's perimeter.

The bias applied to perform the anodic dissolution process may be varied in power and application depending on the user requirements in removing material from the substrate surface. For example, a time varying anodic potential may be provided to the conductive pad 160. The bias may also be applied by electrical pulse modulation techniques. The electrical pulse modification technique comprises applying a constant current density or voltage over the substrate for a first time period, then applying a constant reverse voltage over the substrate for a second time period, and repeating the first and second steps. For example, the electrical pulse modification technique may use a varying potential from between about −0.1 volts and about −15 volts to between about 0.1 volts and about 15 volts.

Conductive materials can be removed from at least a portion of the substrate surface at a rate of about 15,000 Å/min or less, such as between about 100 Å/min and about 15,000 Å/min. In one embodiment of the invention where the copper material to be removed is less than 5,000 Å thick, the voltage may be applied to the conductive pad 160 to provide a removal rate between about 100 Å/min and about 5,000 Å/min.

Figure 5:
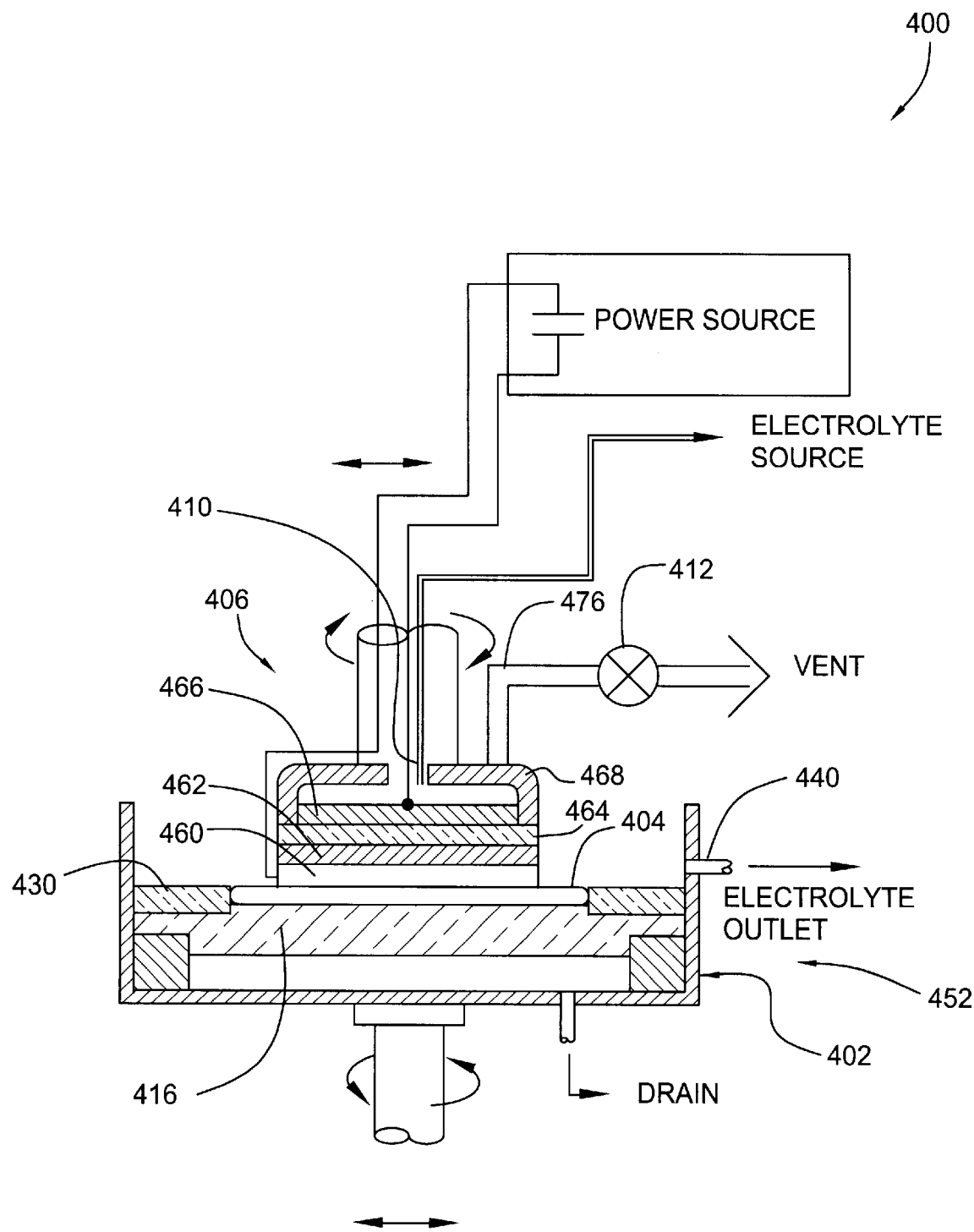
FIG. 5 is a partial sectional view of a processing cell.

FIG. 5 depicts another embodiment of a process cell 400. The process cell 400 includes a polishing head 406 that is smaller than the diameter of a substrate 404 supported within a basin assembly 452 of the cell 400. The basin assembly 452 is generally similar to the basin assembly 152 described above. The basin assembly 452 includes a basin 402 having a carrier 416 disposed therein that is adapted to support the substrate 404. The carrier 416 additionally supports a retaining ring 430 that substantially circumscribes the substrate 404 and prevents the substrate 404 from moving laterally during processing. The basin 402 is generally similar to the basin 102 of the process cell 100, except that the basin 402 needs only be slightly larger than the substrate 404, thereby substantially reducing the amount of electrolyte needed during processing.

Moreover, a smaller polishing head 406 provides lower costs of consumables (i.e., conductive pad 460). The smaller conductive pad 460 enables better control of pad characteristics, for example, surface roughness, global flatness and thickness uniformity among other attributes.

Additionally, as the polishing head 406 is smaller than the substrate 404, the polishing motion therebetween may be programmed or controlled to polishing a first area of the substrate 404 more than a second area. For example, the polishing motion may be configured to spend more time over the center portion of the substrate 404 for more material removal at the center of the substrate 404. The algorithm controlling the polishing motion may be linked or interfaced with an endpoint detection system that measures film thickness. Endpoint detection systems may employ optical or electrical devices, among other detection devices, to determine film thickness. Utilizing information obtained from the endpoint detection system, the algorithm may be modified in-situ to polish more in one area of the substrate than another, thereby compensating for non-uniformities or to clear residues from a specific area of the substrate. The algorithm may be linked to incoming non-uniformity data on incoming substrates to target polishing effort on specific areas of the substrates, thereby resulting in less substrate to substrate variation and optimizing substrate throughput by targeting the polishing effort to specific substrate regions.

The polishing head 406 of the process cell 400 additionally includes an inlet 410 disposed in a housing 468 of the polishing head 406. The inlet 410 is coupled to an electrolyte source (not shown). Electrolyte, from the electrolyte source, flows through a permeable electrode 466, a support disk 464, a membrane 462 and conductive pad 460 onto the substrate's surface before exiting the process cell 400 through an outlet 440 disposed in the basin 402. The flow of electrolyte through the conductive pad 460 is uniformly distributed across the substrate.

The housing 468 additionally includes a vent 476 to allow hydrogen gas to escape through the polishing head 406. The vent 476 may additionally be coupled to a relief valve 412 to prevent electrolyte from inadvertently flowing out of the vent 468.

Figure 6:
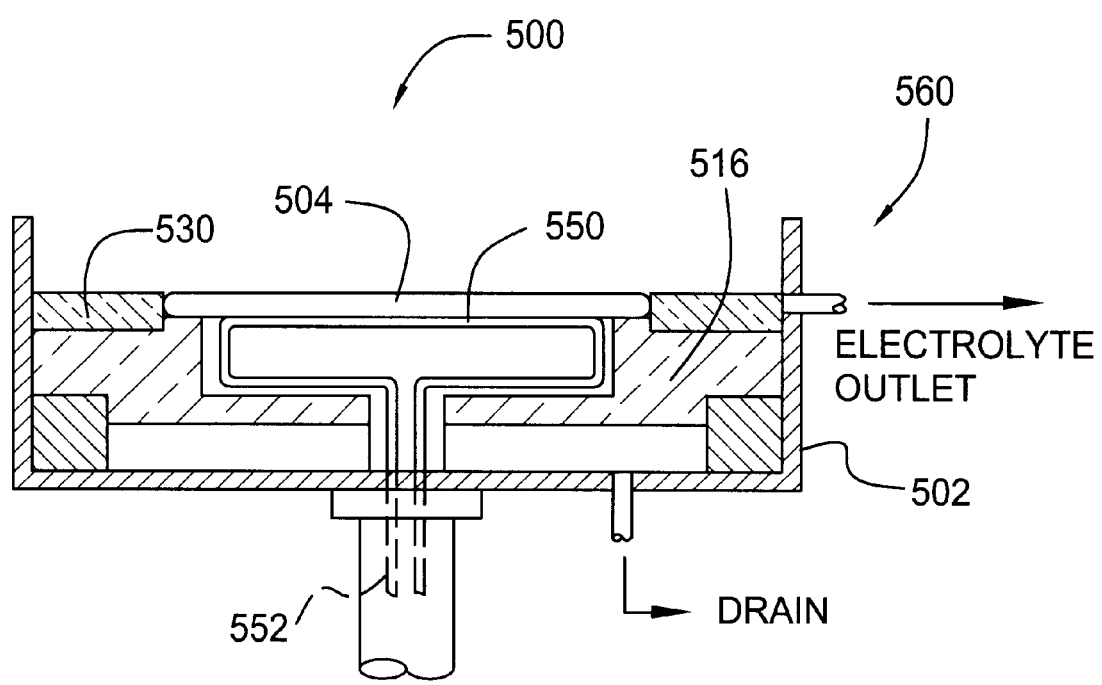
FIG. 6 is a partial sectional view of a portion of another embodiment of a processing cell.

FIG. 6 depicts a partial sectional view of another embodiment of a process cell 500. The process cell 500 includes a basin assembly 560 that is generally similar to the basin assemblies 152 and 452 described above. The basin assembly 560 includes basin 502 and carrier 516 that are generally similar to the basins and carriers of the process cells 100 and 400 described above, except that the carrier 516 includes a bladder 550 that at least partially supports a substrate 504 seated on the carrier 516 during processing. The bladder 550 is coupled to a fluid control source (not shown) by a passage 552 disposed through basin 502. The fluid control source generally may inflate the bladder 550 to place the substrate 504 in a spaced-apart relation with the carrier 516 to facilitate substrate transfer or may be deflated to lower the substrate between a retaining ring 530 supported by the carrier 516 for processing (as shown). A vacuum is developed between the bladder 550 and substrate 504 when the bladder 550 is deflated that retains the substrate to the carrier 516.

Figure 7:
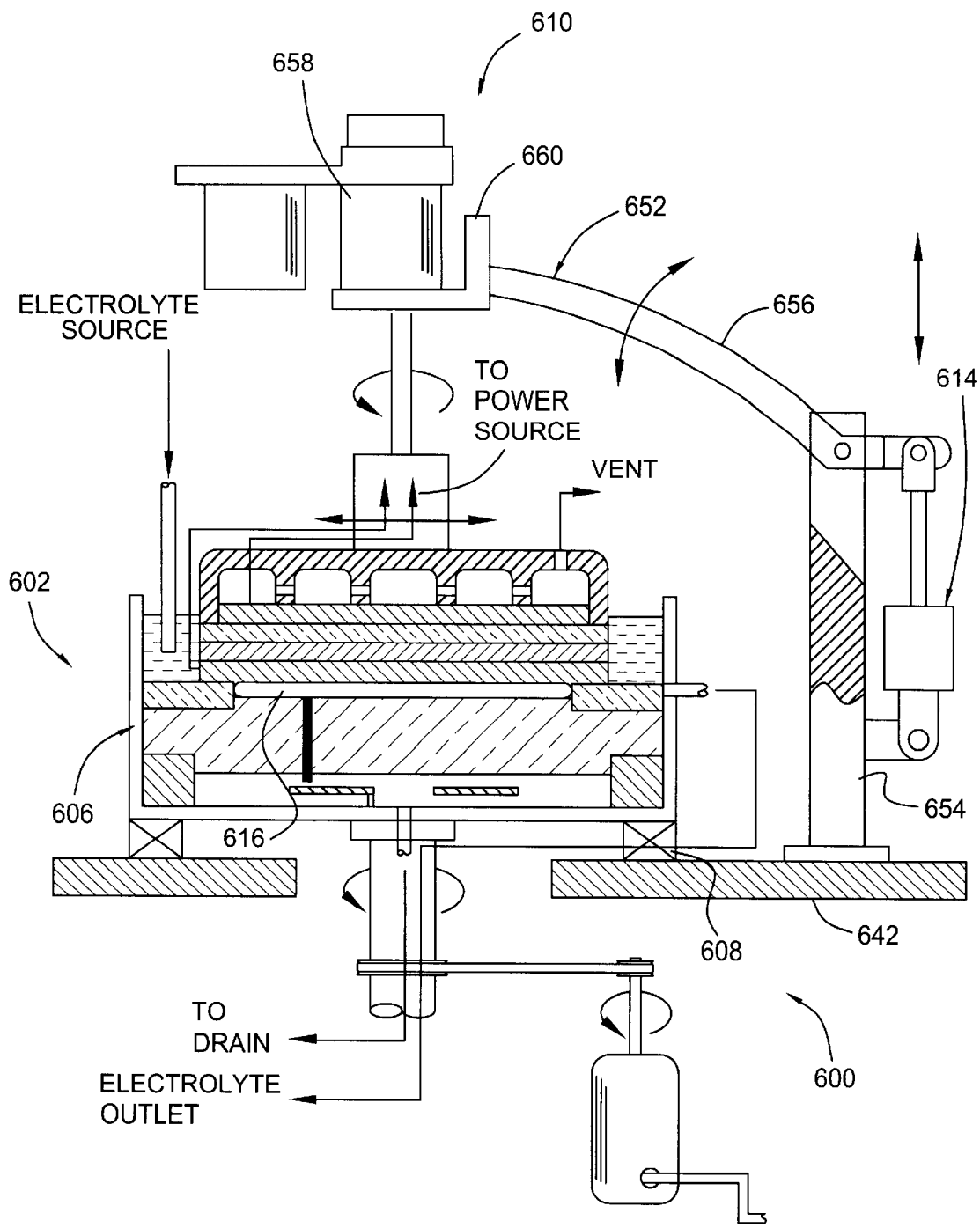
FIG. 7 is a perspective view of one embodiment of a polishing system.

FIG. 7 depicts one embodiment of a polishing system 600 having a process cell 602 suitable for electrochemical deposition and/or chemical mechanical polishing, such as electrochemical mechanical polishing (ECMP) station. The process cell 602 generally includes a base 642 having a basin assembly 606 disposed thereon and a head assembly 610 supported over the basin assembly 606 by a head assembly frame 652. The basin assembly 606 is generally similar to the basin assembly 152 described above, and may be coupled to or rotated above the base 642 on one or more bearings 608 (one is shown).

The head assembly 610 includes a polishing head 612 that can move to place a substrate 616 retained in the basin assembly 606 in contact with a conductive polishing pad 618 coupled to the head assembly 610 during processing. The polishing head 612 is generally similar to the polishing head 106 described above.

The head assembly 610 is generally mounted onto the head assembly frame 652 that includes a mounting post 654 and a cantilever arm 656. The mounting post 654 is mounted to the base 642 of the polishing system 600, and the cantilever arm 656 extends laterally from an upper portion of the mounting post 654. The mounting post 654 may provide rotational movement with respect to a vertical axis along the mounting post to allow the head assembly 610 to move laterally. The head assembly 610 is attached to a mounting plate 660 disposed at the distal end of the cantilever arm 656. The lower end of the cantilever arm 656 is connected to a cantilever arm actuator 614, such as a pneumatic cylinder, mounted on the mounting post 654. The cantilever arm actuator 614 provides pivotal movement of the cantilever arm 656 with respect to the joint between the cantilever arm 656 and the mounting post 654. When the cantilever arm actuator 614 is retracted, the cantilever arm 656 moves the head assembly 610 away from the basin assembly 606 to provide the spacing required to remove or load the substrate from the basin assembly 606 of the polishing system 600. When the cantilever arm actuator 614 is extended, the cantilever arm 656 moves the head assembly 610 toward the basin assembly 606 to a processing position that contacts a substrate 616 retained in the basin assembly 606 with the conductive polishing pad 618 coupled to the polishing head 612.

The head assembly 610 generally comprises the polishing head 612 and a polishing head actuator 658. The polishing head actuator 658 is coupled to the mounting plate 660, and includes a head shaft 662 extending downwardly through the mounting plate 660. The lower end of the head shaft 662 is connected to the polishing head 612 to allow vertical movement of the polishing head 612.

The substrate actuator 658 additionally may be configured to provide rotary motion to the polishing head 612. Relative motion between the substrate and the polishing head 612 during the anodic dissolution process typically enhances the polishing results. The polishing head 612 can also be rotated as the polishing head 612 is lowered to contact the conductive polishing pad 618 to the substrate disposed in the basin assembly 606 as well as when the polishing head 612 is raised to spin off electrolyte from the polishing head 612.

Figure 8:
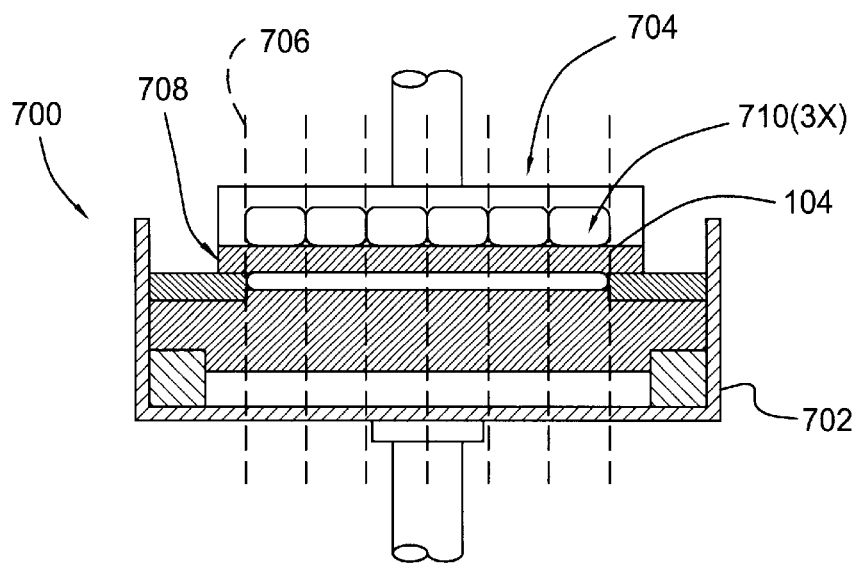
FIGS. 8–10 are simplified schematic views of alternative embodiments of a processing cell.
Figure 9:
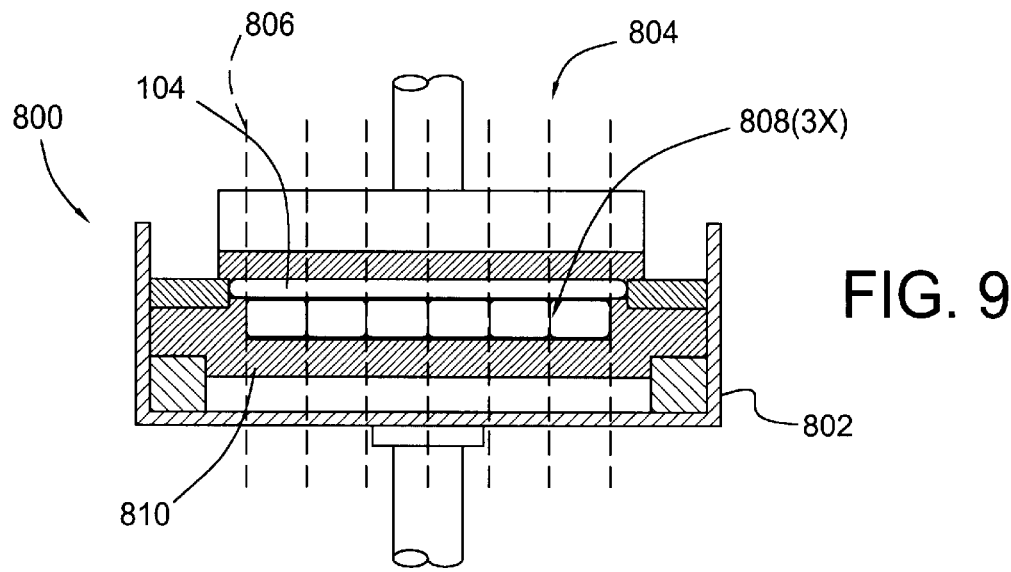
Figure 10:
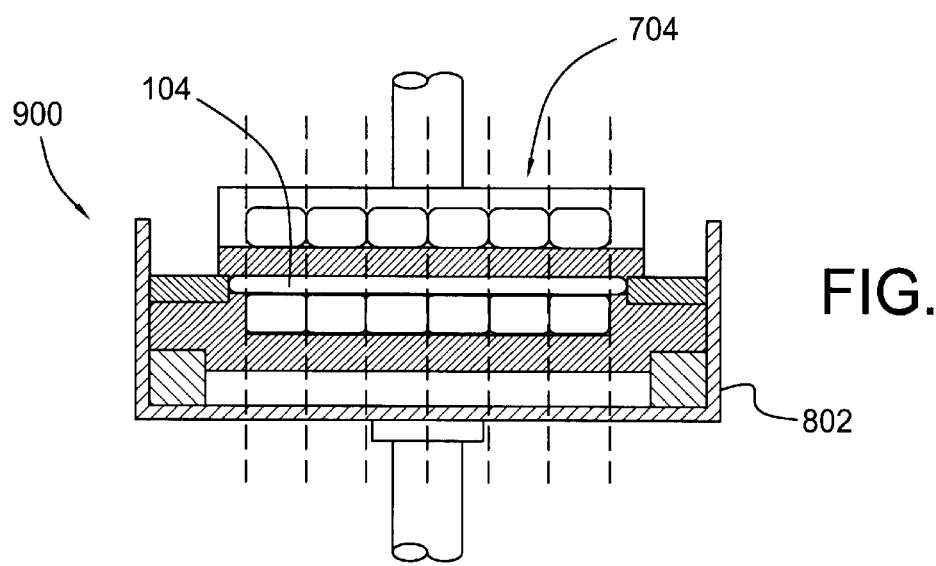

FIGS. 8–10 depict alternative embodiments embodiment of a polishing systems 700, 800 and 900 having polishing pressure control across the diameter of the substrate. In the embodiment depicted in FIG. 8, the process cell 700 includes a basin assembly 702 and a polishing head 704. The basin assembly 702 is generally similar to the basin assemblies 152, 452, 560 and 606 described above.

The polishing head 704 is generally similar to the polishing heads 106 and 406 described above excepted that the polishing head 704 additionally includes a plurality of pressure control zones 706 disposed radially across the polishing head 704 to selectively produce a gradient in the polishing force. The pressure control zones 706 controllably apply force to the adjacent region of a conductive pad 708 coupled to the head 704. Thus, the force applied to the substrate during polishing may be controlled to polish faster in one portion of the substrate than another at different stages of the polishing process. In one embodiment, the pressure zones 706 are controlled by a plurality of annular bladders 710 disposed within the polishing head 704. Other methods for creating a pressure gradient are also contemplated.

In the embodiment depicted in FIG. 9, the process cell 800 includes a basin assembly 802 and a polishing head 804. The polishing head 804 is generally similar to the polishing heads 106, 406 and 612 described above.

The basin assembly 802 is generally similar to the basin assemblies described above excepted that the basin assembly 802 additionally includes a plurality of pressure control zones 806 disposed radially across a carrier 810 the basin assembly 802 to selectively produce a gradient in the polishing force. The pressure control zones 806 controllably apply force to the adjacent region of substrate supported by the carrier 810. Thus, the force applied to the substrate during polishing may be controlled to polish faster in one portion of the substrate than another at different stages of the polishing process. In one embodiment, the pressure zones 806 are controlled by a plurality of annular bladders 808 disposed in a recess formed in the carrier 810. Other methods for creating a pressure gradient are also contemplated.

In the embodiment depicted in FIG. 10, the process cell 900 includes a basin assembly 802 and a polishing head 704. The basin assembly 802 and the polishing head 704 includes pressure control zones 806, 706 that controllably allow the polishing force applied to a substrate being polished to be varied across the diameter of the substrate.

While foregoing is directed to various embodiments of the invention, other and further embodiments of the invention may be devised without departing from the basic scope thereof, and the scope thereof is determined by the claims that follow.

What is claimed is:

1. A polishing apparatus, comprising:
   a basin adapted to contain an electrolyte;
   a substrate carrier disposed in the basin and having an upper surface;
   a substrate supporting surface comprising a portion of the upper surface;
   a substrate retaining ring disposed on the upper surface of the carrier and at least partially circumscribing the substrate supporting surface;
   a polishing head having a housing supported above the basin; and
   a conductive polishing pad coupled to the housing and adapted to contact a substrate disposed on the substrate supporting surface of the carrier.

2. The polishing apparatus of claim 1, wherein the polishing head has a diameter smaller than a diameter of the retaining ring.

3. The polishing apparatus of claim 1, wherein the retaining ring is conductive.

4. The polishing apparatus of claim 1, wherein the retaining ring is coupled to ground.

5. The polishing apparatus of claim 1, wherein the housing includes an interior volume closed by the conductive pad and having an electrode disposed therein.

6. A polishing apparatus, comprising:
   a basin;
   a substrate carrier disposed in the basin and having a substrate receiving pocket adapted to retain a substrate during processing;
   a housing supported above the basin;
   a conductive pad coupled to the housing and having a diameter less than a diameter of the substrate receiving pocket; and
   an electrode disposed in the housing, wherein the basin and housing are adapted to retain a fluid that provides an electrical pathway through the conductive pad between the electrode and the substrate disposed in the substrate receiving pocket.

7. The polishing apparatus of claim 6 further comprising:
   an electrolyte inlet formed though the housing and adapted to flow electrolyte from the electrode through the conductive pad and out of the housing.

8. The polishing apparatus of claim 6, wherein the conductive pad further comprises;
   a dielectric perforated base;
   a plurality of posts extending from the base; and
   a conductive contact pad disposed on at least one of the posts.

9. The polishing apparatus of claim 6 wherein the electrode is permeable to an electrolyte or perforated.

10. The polishing apparatus of claim 8 wherein the housing further comprises a vent adapted to allow gas to escape from the housing.

11. A polishing apparatus, comprising:
    a basin adapted to support a substrate in a face-up orientation;
    a polishing head having a housing supported above the basin;
    a conductive pad coupled to the housing and substantially enclosing an interior volume of the housing; and
    an electrode disposed in the interior volume of the housing.

12. The polishing apparatus of claim 11, wherein the basin further comprises:
    sides configured to retain electrolyte within the basin at a level that contacts the electrode within the housing when the housing is in a processing position.

13. The polishing apparatus of claim 11 further comprising a nozzle coupled to the housing end adapted to introduce electrolyte into the interior volume.

14. The polishing apparatus of claim 11 further comprising a support disk positioned between the electrode and the conductive pad.

15. The polishing apparatus of claim 11, wherein the support disk further is perforated or permeable.

16. The polishing apparatus of claim 15, wherein the support disk is stiffer than the conductive pad.

17. A polishing apparatus, comprising:
    a basin;
    a carrier disposed in the basin and adapted to support a substrate in a face-up orientation;

a housing supported above the basin and having an electrode disposed therein;

a conductive pad coupled to the housing between the electrode and the carrier; and a vent formed through the housing and adapted to allow gas to escape from the housing.

18. The polishing apparatus of claim 17, wherein at least one of the conductive pad and the electrode is permeable to gas.

19. The polishing apparatus of claim 17, wherein the electrode is disposed in a spaced-apart relation to the housing.

20. The polishing apparatus of claim 18, wherein the housing further comprises:

a plurality of spacers disposed between a top of the housing and the electrode, at least one of the spacers having a lateral passage.

21. The polishing apparatus of claim 17 wherein the vent is coupled to a valve adapted to prevent electrolyte from flowing out of the vent.

22. A polishing apparatus, comprising:

a basin adapted to support a substrate in a face-up orientation;

a carrier disposed in the basin and having a substrate supporting surface;

a substrate retainer extending above the carrier and at least partially circumscribing the substrate supporting surface to define a substrate receiving pocket;

a polishing head supported above the basin and including an electrode disposed therein;

a conductive pad coupled to the housing between the electrode and the carrier, the conductive pad having a diameter less than a diameter of the substrate receiving pocket; and a vent formed through the housing for releasing gases generated while polishing a substrate.

23. A conductive pad comprising:

a dielectric base;

a plurality of posts extending from a first side of the base; and a conductive contact pad disposed on at least one of the posts.

24. The pad of claim 23, wherein the dielectric base is perforated.

25. The pad of claim 23 further comprising a conductive element coupled to each conductive contact pad and disposed through the posts and base.

26. The pad of claim 25 further comprising:

a conductive backing disposed on a second side of the base opposite the first side and coupled to each of the conductive elements.

27. The pad of claim 23, wherein the posts are comprised of a compressible material.

28. The pad of claim 23, wherein the base is permeable to electrolyte.

29. A method of polishing a substrate, comprising:

retaining a substrate in a face-up orientation in a basin;

contacting the substrate with a conductive pad coupled to a polishing head, the polishing head having an electrode disposed therein;

flowing electrolyte between the conductive pad and the electrode;

biasing the conductive pad and electrode;

polishing the substrate; and venting gases evolved during polishing through the polishing head.

30. The method of claim 29, wherein the step of flowing electrolyte further comprises:

flowing electrolyte out of the polishing head through the conductive pad.

31. The method of claim 29, wherein the step of flowing electrolyte further comprises:

flowing electrolyte into the basin to a level that at least partially immerses the electrode.

32. The method of claim 29 further comprising:

applying a pressure less than about 1.5 pounds per square inch between the substrate and the conductive pad.

33. A method of polishing a substrate, comprising:

retaining a substrate in a face-up orientation inside a ring;

contacting the substrate with a conductive pad coupled to a polishing head, the polishing head having an electrode disposed therein;

flowing electrolyte between the conductive pad and electrode; and biasing the conductive pad and the electrode.

34. The method of claim 33, wherein the step of flowing further comprising:

flowing electrolyte through the conductive pad end into the polishing end.

35. The method of claim 33, wherein the step of flowing further comprising:

flowing electrolyte into the housing and out through the conductive pad.

36. The method of claim 33, wherein a polishing motion defined by the relative movement between the polishing head and substrate has a range of motion of least less than or equal to a surface area of the substrate.

37. A method of polishing a substrat, comprising:

contacting a substrate with a conductive pad in a polishing motion defined by the relative movement between the conductive pad and substrate and having a range of motion of at least less than or equal to a surface area of the substrate;

flowing electrolyte between an electrode and the conductive pad; and biasing the conductive pad and the electrode.

38. The method of claim 37 further comprising:

retaining a substrate in a face-up orientation inside a basin.

39. The method of claim 37 further comprising:

venting gas through a polishing head that contains the electrode therein.

40. The method of claim 37, wherein the biasing of the conductive pad and electrode causes material to be electrochemically removed from the substrate.

41. The method of claim 37, wherein the biasing of the conductive pad and electrode causes material to be electrochemically deposited on the substrate.

42. The method of claim 37 further comprising:

flowing electrolyte into the polishing head and out through the conductive pad.

43. The method of claim 37, wherein step of flowing electrolyte further comprises:

flowing electrolyte into a basin retaining the substrate to a level that at least partially immerses the electrode.

44. The method of claim 37 further comprising:

applying a pressure less than about 6 pounds per square inch between the substrate and the conductive pad.

45. The polishing apparatus of claim 1, wherein the substrate retaining ring further comprises:

an inner diameter defining an upwardly facing substrate receiving pocket.

46. A polishing apparatus, comprising:

a substrate carrier having an upper substrate supporting surface adapted to support a workpiece in a feature side up configuration;

a substrate retaining ring disposed on the substrate carrier and at least partially circumscribing the substrate supporting surface; and a conductive polishing pad supported above the substrate carrier and adapted to contact a workpiece disposed on the substrate supporting surface of the carrier.

* * * * *